United States Patent [19]

Lister

[11] 4,387,764
[45] Jun. 14, 1983

[54] GASKET SCREENING ASSEMBLY FOR AN INTERNAL COMBUSTION ENGINE HAVING AN AUXILIARY OIL COOLER

[75] Inventor: Marc D. Lister, Wilmette, Ill.

[73] Assignee: Felt Products Mfg. Co., Skokie, Ill.

[21] Appl. No.: 327,259

[22] Filed: Dec. 3, 1981

[51] Int. Cl.³ .................. F28F 19/00; B01D 29/04
[52] U.S. Cl. ........................... 165/119; 123/41.55; 123/196 A; 123/196 AB; 210/168; 210/445
[58] Field of Search .................. 210/167, 168, 433.1, 210/434, 445, 450, 499, 541, 542; 165/119; 123/41.55, 196 R, 196 A, 196 AB, 196 S

[56] References Cited

U.S. PATENT DOCUMENTS

| | | | |
|---|---|---|---|
| 1,236,100 | 8/1917 | Nance | 210/445 |
| 1,361,243 | 12/1920 | Fuson | 210/445 |
| 1,362,028 | 12/1920 | Miller | 210/445 |
| 1,398,063 | 11/1921 | Brown | 210/445 |
| 1,558,777 | 10/1925 | Barrett | 123/41.55 |
| 2,504,683 | 4/1950 | Harnley | 210/445 |
| 2,665,009 | 1/1954 | Harstick | 210/445 |
| 3,622,008 | 11/1971 | Mucci | 210/445 |
| 3,830,289 | 8/1974 | Olson | 165/119 |
| 3,919,089 | 11/1975 | Gonzalez | 210/445 |
| 4,174,699 | 11/1979 | Gill | 123/196 A |

FOREIGN PATENT DOCUMENTS 28671 of 1896 United Kingdom ............ 210/445

Primary Examiner—Ernest G. Therkorn
Attorney, Agent, or Firm—Dressler, Goldsmith, Shore, Sutker & Milnamow, Ltd.

[57] ABSTRACT

A gasket screening assembly for an internal combustion engine having an auxiliary oil cooler. A gasket screening assembly is provided between a flange on the block and a complementary flange on the cooler support. Four passageways, two for oil and two for coolant are provided between the cooler support and block through the gasket screening assembly, each being sealed from the other. The coolant path from the block to the cooler support through the gasket assembly is provided with a gasket portion which screens out particles which would tend to block the oil cooler tubes. The gasket screening assembly includes a core, peripheral facing layers and a central zone devoid of facing material. The central zone defines a multiplicity of substantially circular perforations of from $\frac{1}{8}$ inch to 3/16 inch in diameter in staggered rows. The zone having the facing layers defines clear-through oil inlet and outlet openings and a clear-through coolant return opening.

6 Claims, 5 Drawing Figures

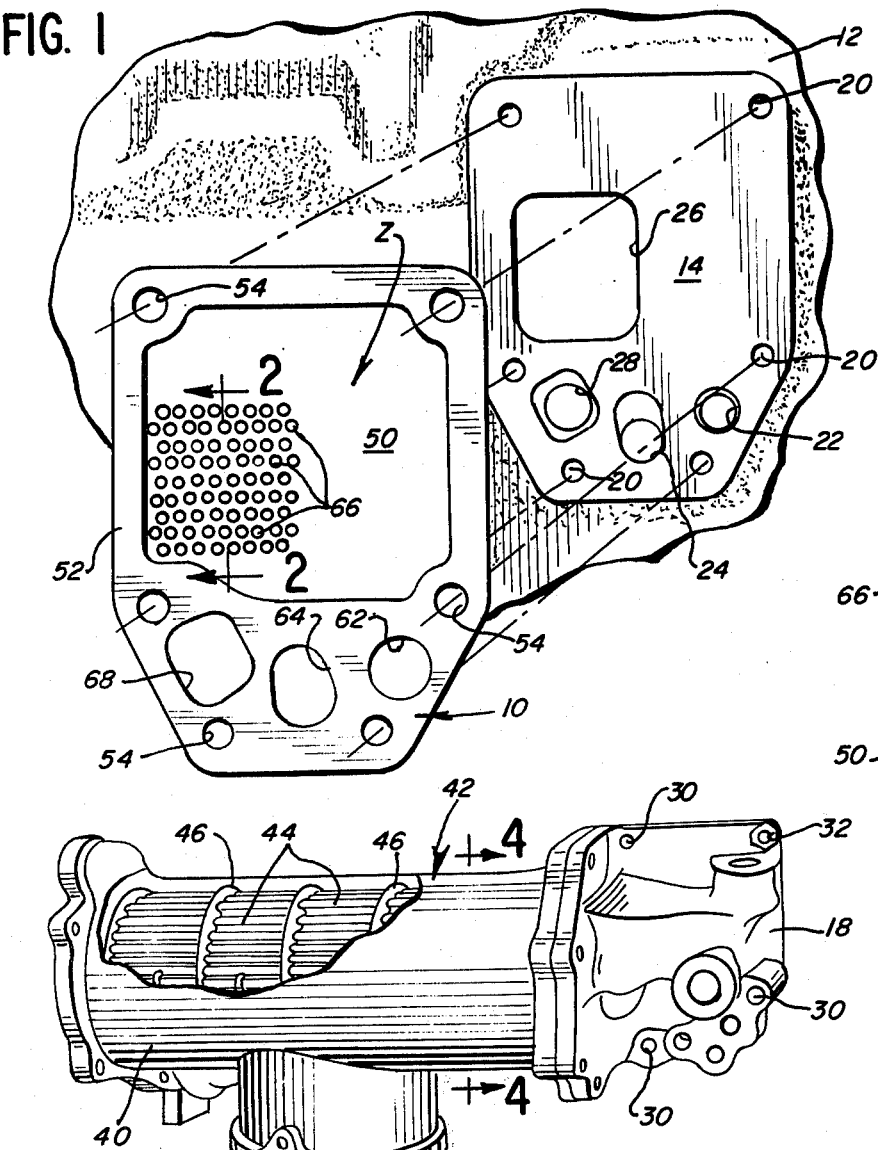
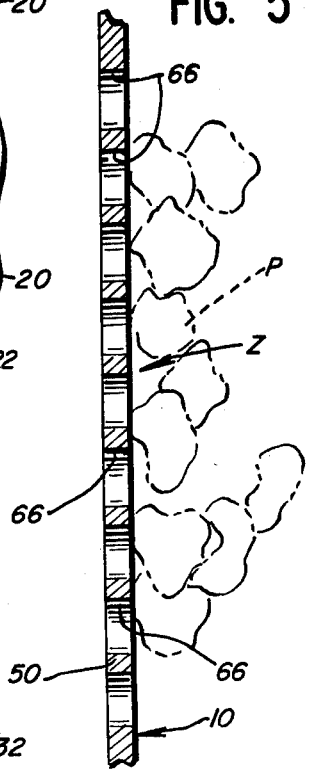
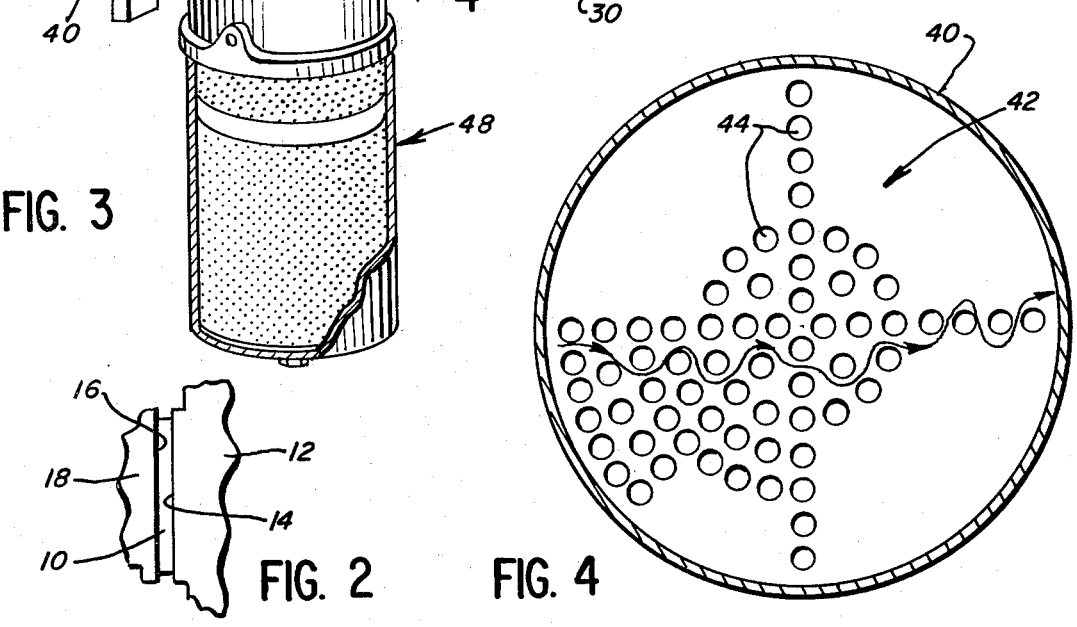

GASKET SCREENING ASSEMBLY FOR AN INTERNAL COMBUSTION ENGINE HAVING AN AUXILIARY OIL COOLER

TECHNICAL FIELD

Auxiliary oil coolers for internal combustion engines frequently utilize a series of tubes through which coolant passes, and over and around which the oil to be cooled passes. Particulate buildup in the tubes tends to result in blocked tubes, reducing the efficiency of the cooler, and sometimes resulting in engine burn out.

BACKGROUND OF THE INVENTION

In auxiliary oil coolers in which coolant such as water passes through tubes for cooling externally moving oil, various approaches have been considered for minimizing or preventing blockage of the coolant tubes, with resultant overheating or failure of the associated engine.

Usually the auxiliary cooler assembly is secured directly or through a supplementary fitting to the engine block with appropriate gaskets interposed between the block and the auxiliary cooler. Generally the gaskets provide four flow paths to and from the block, namely an oil exit path, running from the block to the auxiliary cooler, an oil inlet path returning from the cooler to the block, a coolant exit opening running from the block to the auxiliary cooler, and a coolant inlet opening returning coolant to the block. Such flow paths and associated openings in the block, auxiliary cooler fittings and interposed gasket are clear-through openings. Particulate material which develops in the engine and radiator is frequently found in the coolant, is entrained therein and therefore passes into the tubes of the auxiliary cooler.

Although consideration has been given to interposing filtering or screening elements in the coolant lines and flow paths, no fully satisfactory solution to removal of the particles which have the capacity of blocking the auxiliary cooler tubes has been found.

SUMMARY OF THE INVENTION

In accordance with the present invention, an improved and successful mechanism for screening and removing particles from coolant moving from an engine block to an auxiliary cooler has been developed. Thus, a new gasket assembly has been developed which can be used instead of existing gasket assemblies, but which is specially configured to serve not only as a gasket, but also to screen out and hold back particles of predetermined sizes from passing from the block to the auxiliary oil cooler. The gasket screening assembly of this invention not only screens particles, but is configured and assembled such that the materials used in making the gasket itself are not likely to become disassociated from the gasket and thereby pass to the oil tubes where they could also serve to block the tubes.

An improved screening gasket assembly of this invention has an expansive metallic core having a pair of major surfaces, and a compressible facing layer secured to each major surface of the core about the periphery of each the major surface thereby to surround a central core zone of each major surface which is devoid of a facing layer. The assembly defines a first clear-through return opening for coolant, a second clear-through oil exit opening, and a third clear-through oil inlet opening, each in the zones of the facing layers for providing flow-paths between an engine block and an auxiliary oil cooler. The core central zone defines a multiplicity of closely adjacent, substantially circular perforations for providing a fourth, water inlet path through the central core zone between the engine block and the oil cooler.

The screening gasket assembly is adapted to be sealingly disposed between the confronting flanges on the engine block and the oil cooler assembly. The flanges clampingly and sealingly grip the screening gasket assembly and define bores in line with and in flow communication with the first through third openings, and the perforations, whereby particles in the coolant passing through the multiplicity of perforations are adapted to be screened therefrom against introduction into the cooler, hence against return through the first clear-through coolant return opening. Preferably, the multiplicity of perforations are arranged in a plurality of staggered rows of perforations.

Other advantages and features of the present invention will become apparent from the following detailed description of the invention and an embodiment thereof, from the claims, and from the accompanying drawings.

BRIEF DESCRIPTION OF THE DRAWINGS

FIG. 1 is an exploded view of a gasket assembly of this invention juxtaposed with an engine block with which it is adapted for use;

FIG. 2 is a fragmentary view showing the gasket assembly of this invention disposed between an engine block and a cooler support;

FIG. 3 shows the cooler support, the auxiliary cooler and the filter assembly with which the gasket assembly of this invention is adapted to be used;

FIG. 4 is a cross-sectional view taken substantially along lines 4—4 of FIG. 3; and FIG. 5 is an enlarged fragmentary view of the filter zone of the gasket assembly of FIG. 1.

DESCRIPTION OF THE ILLUSTRATIVE EMBODIMENT

Referring now to the drawings, FIG. 1 illustrates a filter gasket assembly 10 of this invention. Gasket assembly 10 is adapted to be mounted to an engine block 12 at block flange 14, and between flange 14 and a confronting complementary cooler support flange 16 of cooler support 18.

Block flange 14 defines a plurality of threaded bolt bores 20, an oil exit opening 22, an oil inlet opening 24, a coolant exit opening 26 and a coolant inlet opening 28. Confronting complementary openings are defined in cooler support flange 16. Bolt holes 30 in support 18 are in line with bores 20, thereby to bolt the support to the block, as via bolts 32.

Support 18 may be a casting which defines curved internal passageways for oil and coolant to be introduced into the cooler assembly and to be returned from the cooler assembly to the block. In the embodiment illustrated, the block coolant exit opening is in communication with the zone of the cooler assembly between the cooler housing 40 and the heat exchange element 42. Heat exchange element 42 comprises a plurality of elongate tubes 44 and spiral fin elements 46 which causes the oil to pass over and between the tubes, to pass through the oil filter 48, for subsequent return to the block through oil inlet opening 24.

Coolant, such as water, passes through block coolant exit opening 26, through the associated passageway in support 18, through tubes 44, for return to the block through coolant inlet opening 28.

Thus substantial supplementary cooling of the oil may be effected in the auxiliary cooler assembly. However, it is important to maintain the tubes 44 completely open so that maximum efficiency of the cooling assembly may be obtained. Because particles which can plug tubing frequently build up in internal combustion engine cooling systems it is necessary to provide an effective system for screening out and removing those particles. If not removed, the tubes will gradually plug up which can result in overheating and destruction of the engine. The filter gasket assembly of this invention minimizes that possibility.

To that end, filter gasket assembly 10 desirably comprises an expansive flat metallic core 50 which may be made of 304 stainless steel. Core 50 typically may be 0.008 inch thick. A peripheral facing 52 is laminated to each major surface of core 50. Only one facing 52 is shown. The other is a mirror image. Facings 52 are rubber-fiber facings and may desirably be of an asbestos-rubber material, such as asbestos-nitrile rubber, adhesively laminated to the core. Facings 52 are sufficiently compliant and compressible to effect a seal between the confronting flanges 14 and 16, hence to provide an effective seal at the juncture of the block 12 and cooler support 18.

Gasket assembly 10 defines a plurality of bolt holes 54 corresponding to the bolt bores 20. Bolt holes 54 are located in the zone of the facings 52. The gasket also defines appropriate bores to allow oil and water to pass therethrough, including an oil exit bore 62, an oil inlet bore 64 and a coolant inlet bore 68. Each of these desirably is in the zone of the facings 52, thereby to provide an effective seal between the block flange openings 22, 24 and 28 and the complementary openings in the confronting cooler support flange 16.

The block coolant exit opening is in communication with a zone Z of the gasket assembly which is defined by the somewhat irregular openings in the facings shown in FIG. 1. Thus substantially the core only defines the exit opening in the gasket assembly through which coolant exits from the block. The surrounding peripheral facing portions serve then to seal off the remaining openings from zone Z and to prevent leakage from zone Z outwardly therefrom.

Zone Z is very substantially larger than the area needed to provide the necessary flow of coolant from exit opening 26. A series of perforations 66 are provided in zone Z and the surface area of the perforations are more than adequate to accommodate coolant exit flow from the blade into tubes 44. As will be appreciated, the absence of facing material or other materials which might break off and then pass into the tubes, or which might result in expansion of the size of the perforations, thereby to defeat their purpose, is a feature of zone Z which comprises solely a metallic perforated screen.

Perforations 66 most preferably are substantially circular in plan view and are closely spaced in staggered rows, such as the nine rows illustrated. Preferably the array of perforations is disposed in alignment with opening 26 for the spacing of the core 50 from flange face 14 is maximally the thickness of the facing 52 which is insufficient to provide flow without undue increase in frictional resistance to the flow of the coolant.

The sizes of perforations 66 are selected to filter out particles P which would tend to produce obstructions individually or collectively in the tubes, on the one hand, and to minimize pressure build-up and plugging of the perforations in zone Z, on the other hand. It has been determined that perforations approximately 5/32" in diameter are most effective, although openings of from about ⅛" to about 3/16" in diameter will also function satisfactorily. Most desirably, the perforations should be substantially circular. Openings which substantially depart from circular, such as those which are elongate, such as rectangular, will have to be reduced in one dimension to the maximum particle size for which passage is permissible. The other dimension perforce would have to be less, and would therefore also tend to increase pressure drop through the filter zone. Further, rectangular openings would tend to foster break-up of particles, in turn causing particles to pass into the tubes.

To enhance the sealing characteristics of the gasket assembly 10, it is also desirable to provide a very thin coating of a friction-resistant material, such as polytetrafluoroethylene, in a thickness from about 0.0005 to about 0.002 inch. Desirably the coating is provided on both major surfaces of the gasket assembly, both on the central core portion 50 and on the surface of the facings 52.

It will be apparent from the foregoing that further embodiments of this invention may be made without departing from the spirit and scope of the invention. Accordingly, the scope of the invention is to be considered as being limited only insofar as may be made necessary by the claims.

I claim:

1. A combined gasket screening assembly for sealing an internal combustion engine block to an associated oil cooler comprising
    an expansive, generally flat metallic core having a pair of major surfaces,
    a peripheral compressible facing layer secured to each major surface of said core surrounding a central core zone of each major surface which is devoid of a facing layer,
    at least one clear-through opening for liquid in the zones of said facing layers for providing a return flow-path between a said oil cooler and a said engine block,
    said core zone defining a multiplicity of closely adjacent, substantially circular perforations for providing a flow-path through said central core zone in said gasket screening assembly between a said engine and a said oil cooler,
    whereby particles are adapted to be screened from liquid passing through said multiplicity of perforations against return through said clear-through opening.

2. A combined gasket screening assembly in accordance with claim 1, wherein said gasket assembly defines a clear-through oil exit outlet and a clear-through oil inlet in the zones of said facing layers and wherein said clear-through opening for liquid is a coolant inlet opening.

3. A combined gasket screening assembly in accordance with claim 2, wherein said multiplicity of perforations are arranged in a plurality of staggered rows of perforations.

4. Means sealing an internal combustion engine block to an associated oil cooler assembly for screening particles from the coolant passing through the oil cooler comprising a screening gasket assembly having an expansive metallic core having a pair of major surfaces, a compressible facing layer secured to each major surface of said core about the periphery of each said major surface thereby to surround a central core zone of each major surface, a first clear-through opening for coolant, a second clear-through oil exit, and a third clear-through oil inlet, each in the zones of said facing layers for providing flow-paths between said engine block and said oil cooler, said central core zone defining a multiplicity of closely adjacent, substantially circular perforations for providing a fourth, water inlet path through said central core zone in said gasket screening assembly between said engine block and said oil cooler, flanges defined by each of said engine block and oil cooler assembly for clampingly and sealingly gripping said screening gasket assembly, and each said flange defining bores in line with and in flow communication with said first through fourth openings, whereby particles in water passing through said multiplicity of perforations are adapted to be screened from liquid passing through said multiplicity of perforations against return through said first clear-through coolant opening.

5. Means in accordance with claim 4 wherein said central zone portions of said major surfaces are devoid of a facing layer in the area of said perforations.

6. Means in accordance with claim 4, wherein said multiplicity of perforations are arranged in a plurality of staggered rows of perforations.

* * * * *